United States Patent [19]

Hutchins et al.

[11] Patent Number: 4,694,906

[45] Date of Patent: Sep. 22, 1987

[54] METHOD FOR EMPLACEMENT OF A GELATINOUS FOAM IN GAS FLOODING ENHANCED RECOVERY

[75] Inventors: Richard D. Hutchins, Placentia; Hoai T. Dovan, Fullerton, both of Calif.

[73] Assignee: Union Oil Company of California, Los Angeles, Calif.

[21] Appl. No.: 771,283

[22] Filed: Aug. 30, 1985

[51] Int. Cl.$^4$ ............................................. E21B 33/13
[52] U.S. Cl. .................................. 166/294; 166/273; 166/274; 166/275
[58] Field of Search ............... 166/273, 274, 275, 294, 166/309

[56] References Cited

U.S. PATENT DOCUMENTS

| | | | |
|---|---|---|---|
| 3,251,417 | 5/1966 | Holman et al. | 166/309 X |
| 3,323,593 | 6/1967 | Foshee et al. | 166/294 X |
| 3,330,346 | 7/1967 | Jacobs et al. | 166/273 |
| 3,342,256 | 9/1967 | Bernard . | |
| 3,410,344 | 11/1968 | Cornelius | 166/309 X |
| 3,421,584 | 1/1969 | Eilers et al. . | |
| 3,529,668 | 9/1970 | Bernard . | |
| 3,687,200 | 8/1972 | Routson . | |
| 3,740,360 | 6/1973 | Nimerick . | |
| 3,762,476 | 10/1973 | Gall . | |
| 3,782,470 | 1/1976 | West . | |
| 3,825,067 | 7/1974 | Vestal . | |
| 3,841,399 | 10/1974 | Ryan . | |
| 3,948,323 | 4/1976 | Sperry . | |
| 3,993,133 | 11/1976 | Clampitt | 166/272 |
| 4,009,755 | 3/1977 | Sandiford . | |
| 4,015,995 | 4/1977 | Hess .. | |
| 4,018,286 | 4/1977 | Gall et al. . | |
| 4,043,922 | 8/1977 | Palmer et al. . | |
| 4,069,869 | 1/1978 | Sandiford . | |
| 4,113,011 | 9/1978 | Bernard et al. . | |
| 4,120,361 | 10/1978 | Threlkeld et al. . | |
| 4,300,634 | 11/1981 | Clampitt . | |
| 4,330,038 | 5/1982 | Soukup . | |
| 4,390,068 | 6/1983 | Patton . | |
| 4,413,680 | 11/1983 | Sandiford . | |
| 4,495,995 | 1/1985 | Chin et al. | 166/309 X |
| 4,534,412 | 8/1985 | Dovan et al. | 166/294 X |

OTHER PUBLICATIONS

"Fracturing Using a Stabilized Foam Pad" by B. R. Ainley and J. G. Charles, Society of Petroleum Engineers of AIME, SPE/DOE 10825, presented at Symposium of the Society of Petroleum Engineers held May 16–18, 1982, pp. 197–300.

"Field Demonstration of the Conventional Steam Drive Process with Ancillary Materials" by R. L. Eson and H. J. Lechtenberg, Final Report, United States Department of Energy, Mar. 1983.

"Use of a Novel Liquid Gelling Agent for Acidizing in the Levelland" by B. Leggett, L. R. Norman, J. R. Colbert, and D. O. Nelson, SPE 11121, presented at 57th Annual Fall Technical Conference held Sep. 26–29, 1982, pp. 1–5.

"Evaluation of a Conventional Steam Drive with Ancillary Materials: North Kern Front Field," by Rod L. Eson and Stephen K. O'Nesky, Chemical Oil Recovery Co., SPE No. 10775, pp. 891–895.

Primary Examiner—Stephen J. Novosad
Assistant Examiner—Thomas J. Odar
Attorney, Agent, or Firm—Dean Sandford; Gregory F. Wirzbicki; June M. Bostich

[57] ABSTRACT

The permeability of higher permeability zones of a subterranean reservoir of heterogeneous permeability is reduced by injecting (1) an aqueous solution of a crosslinkable water-soluble polymer, a material capable under certain conditions of at least partially crosslinking the polymer to form a gelatinous precipitate, a water-soluble alkaline material in an amount sufficient to maintain the pH of the aqueous solution above the pH at which crosslinking occurs until the composition has passed a desired distance through the reservoir, and a water-soluble surface active agent; and (2) a gas mixture comprising an acid gas. A gelatinous foam forms in situ useful for blocking escape of fluids, both gaseous and liquid, into the higher permeability zones of the reservoir during enhanced recovery, typically by carbon dioxide flooding. The polymer-surfactant solution and the gas mixture can be injected in alternating slugs to enhance formation of the gelatinous foam and to allow for plugging of higher permeability zones progressively encountered during recovery operations.

43 Claims, No Drawings

METHOD FOR EMPLACEMENT OF A GELATINOUS FOAM IN GAS FLOODING ENHANCED RECOVERY

BACKGROUND OF THE INVENTION

The present invention relates to a process of stimulating oil recovery from subterranean reservoirs or formations utilizing injection of gases. It is more specifically concerned with improving the efficiency of a secondary oil recovery process wherein foam is generated in situ to reduce permeability of the more permeable zones of a subterranean reservoir during a gas flooding treatment.

Significant quantities of low gravity crude oil exist in underground formations. Because of this, techniques have been developed for stimulating production of oil from such reservoirs. However, the high viscosity of the oil remaining in such formations makes recovery difficult and expensive. A number of methods designed to stimulate recovery of high viscosity petroleum have been used, including water flooding, steam injection, and gas injection, but none to date has been totally satisfactory. Typically, water flooding is inefficient for displacing viscous oil due to the oil's high viscosity. Steam injection lowers viscosity, but is also unsatisfactory in certain types of formations and requires availability of inexpensive fuel and a large supply of clean water. In the most common method of steam injection, "huff and puff" steam injection, the well is used for alternate injection of steam and production of reservoir fluids. A recent variation of the "huff and puff" steam injection method for reducing the viscosity of viscous oil is disclosed by West in U.S. Pat. No. 3,782,470. Immediately following the injection phase of a "huff and puff" steam stimulation process, which lowers viscosity of the oil, a non-condensing, non-oxidizing gas is injected at ambient temperature. The gas displaces the low viscosity oil and thereby improves oil production rates, reduces the volume of steam required, and improves the water-oil ratio of the well. However, where a multi-component gas is employed, such as natural gas, the higher molecular weight hydrocarbons tend to condense as the formation cools following steam injections. The condensed hydrocarbons have high solubility and even miscibility with most crudes. As a result, crude oil may be miscibly displaced from the vicinity of the wellbore, resulting in reduced permeability to oil at the wellbore.

A typical method of gas flooding utilizes recycled reservoir gases, reinjecting at the injection well at least a portion of those gases produced at the production well. Such produced gases often contain small amounts of components which become acidic when dissolved into reservoir waters, such as hydrogen sulfide, sulfur oxides, and carbon dioxide. If present in large amounts, the acidic components in reinjected reservoir gases may cause damage to the area surrounding the wellstem. To avoid these problems it has recently been proposed that nitrogen be used in gas flooding regimes.

To enhance the effectiveness of gas flooding, a miscible gas that reduces viscosity of the oil may be used. However, unless the solvent gas remains soluble, it will usually be produced preferentially to the oils as an immiscible mobile phase. One of the most successful gas solvents used to stimulate recovery of viscous oils is carbon dioxide. The high solution factor of carbon dioxide in crude oil causes the viscosity of the carbon dioxide-crude oil solution to be markedly lower than that of the crude alone. For illustrative examples of stimulation processes utilizing carbon dioxide, reference is made to U.S. Pat. No. 3,442,332, which incorporates a list of U.S. patents and publications on the subject at column 2, lines 24 through 49.

It has long been known that recovery of petroleum using carbon dioxide could be greatly increased if the carbon dioxide were used in slug form and driven through the reservoir by an aqueous drive fluid, such as saline, plain, or carbonated water. A process using this technique is disclosed by Holm in U.S. Pat. No. 3,065,790. However, even alternate-injection, water-solvent processes using carbon dioxide as a solvent succeed in recovering only the petroleum in the reservoir contacted by the injected carbon dioxide. Large quantities of uncontacted petroleum are bypassed and left in the reservoir because an unfavorable mobility relationship between reservoir fluids and injected fluids causes the carbon dioxide to channel off into areas of high permeability. In the art of oil recovery the areal sweep efficiency of oil displacement is greatest when the viscosity of the displacing fluid is equal to or greater than the viscosity of the displaced oil and/or the permeability of the displacing fluid is less than or equal to that of the oil. Since carbon dioxide is less viscous and more mobile than most crude oils, it is not of itself a very efficient oil displacement agent.

The areal sweep efficiency of gas flooding, particularly of carbon-dioxide recovery, is increased by generating a foam in situ to block the highly permeable features of the underground formation. U.S. Pat. No. 3,342,256 to Bernard et al. (which is hereby incorporated by reference in its entirety) discloses alternative methods for generating foam in situ to prevent channeling of carbon dioxide into high permeability channels away from the zone to be treated. In one embodiment, a small amount of a surfactant or foaming agent is dissolved in the carbon dioxide, which is maintained as a dense fluid or liquid at pressures in excess of about 700 p.s.i.g. to ensure solubility. A subsequently injected drive medium, such as water, forces the carbon dioxide-surfactant mixture through the formation to a production well where production continues until the produced fluids exhibit an undesirably high water/oil ratio. Production is then terminated, and the formation is depressured to allow dissolved gases to come out of solution and form the foam. As the foam expands, it drives additional oil towards the producing well.

In an alternative embodiment, alternate slugs of carbon dioxide and the foaming agent, usually dissolved in an aqueous or hydrocarbon vehicle, are introduced into the reservoir. When a hydrocarbon vehicle is employed, the liquid light hydrocarbons will flash, producing a gas to generate foam in the areas of the reservoir of high pressure gradient, such as is found in high permeability channels. If a carbonated water vehicle is used to dissolve the foaming agent, upon encountering such areas of reduced pressure, the carbon dioxide will come out of solution and generate foam. The foam generated in situ by these released gases blocks the highly permeable strata and will prevent subsequently injected slugs of carbon dioxide from channeling into highly permeable zones.

Relying upon gases released in low pressure zones to generate the foam, however, presents certain disadvantages. When the foaming agent is dissolved directly into carbon dioxide or into carbonated water, a large portion of the gaseous carbon dioxide released in the low pressure zone does not go to generating foam, but is preferentially absorbed into the crude. And if the released carbon dioxide migrates into a high pressure region, solubility of carbon dioxide is increased and may approach miscibility at pressures in excess of about 700 p.s.i.g. These difficulties are not encountered if the foaming agent is dissolved in a hydrocarbon vehicle, but the cost of liquid hydrocarbons is generally prohibitive. Moreover, a hydrocarbon-soluble surface active agent generally foams the oil and restricts its movement through the reservoir. The upshot is that increasing the areal sweep efficiency of the recovery method by generating foam in situ is much more difficul and expensive in the reservoir than laboratory results might otherwise indicate.

An alternative method of plugging zones of high permeability within oil-bearing formations to control the flow of liquids through the reservoir utilizes formation of polymer plugs in situ. Typically various combinations are employed of a water-soluble polymer; a pH sensitive crosslinking agent reactive with the polymer, such as a polyvalent metal; and a pH controlling or buffering agent to control the time at which the crosslinking occurs. Typically, an acid or acid-releasing agent and/or an alkaline material are included in the polymer-containing solution as the pH-controlling or buffering agent.

For delayed crosslinking of polymer solutions within the reservoir, various techniques are known whereby the polymer solution is injected at a pH above that at which crosslinking typically occurs and the pH of the solution is reduced within the formation to trigger in situ gelation. For instance, the polymer-containing solution can be injected at an elevated pH, and then the reservoir rock is allowed to adsorb sufficient alkaline materials out of the injected solution to lower its pH below that at which crosslinking occurs. Or, a decrease in pH caused by connate waters from the reservoir diluting the polymer-containing solution can be relied upon to trigger crosslinking in situ. In some instances, a material that hydrolyzes within the reservoir is included in the polymer-containing aqueous solution so that crosslinking can be delayed until the polymer is emplaced into the formation. Nimerick in U.S. Pat. No. 3,740,360 discloses the latter method. Alternatively, the pH-controlling agent can be introduced into the reservoir in a separate slug immediately following a slug of the polymer solution to delay the crosslinking until the polymer solution has been placed into the reservoir. For example, U.S. Pat. Nos. 4,009,755 and 4,069,869 to Sandiford deal with forming plugs in wells wherein a gelatinous plug is formed in the reservoir by injecting (a) a water-soluble polymer, (b) a crosslinking material such as a compound of a multivalent metal and a reducing agent, such as a low-molecular weight water-soluble aldehyde, or a colloidal hydroxide of a multivalent cation, (c) an aqueous solution of an alkali metal silicate and (d) a gelling agent that reacts with the silicate to form a silicate-containing gelatinous plug.

Although gelatinous plugs typically are effective for controlling the flow of liquids, they are relatively ineffective for controlling the flow of gases. To restrict flow of a gas, such as gaseous carbon dioxide, through the higher permeability zones of a reservoir, an increased pressure drop such as is provided by a foam plug is normally required. But foams possess certain inherent disadvantages. Foams placed into the reservoir to block the flow of gases cannot withstand contact with water and other liquids, which dilute the concentration of the surface active agent and break down the bubbles in the foams. Also, foams tend to drain away naturally due to the action of gravity on the bubbles so that gases in the foam which are soluble in oil, such as carbon dioxide, are lost into solution.

Accordingly, while each of the foregoing methods has met with some success, the need exists for further developments in enhanced oil recovery. For example, a need exists for an improved method of blocking the highly permeable zones of producing formations during gas flooding, especially during carbon dioxide flooding, so that the flooding gas is not lost into the highly permeable, relatively oil-free zones of the reservoir but contacts a larger cross-section of the oil-bearing strata. What is particularly needed is a method for creating a gelatinous foam in situ by injecting gases comprising an acid gas such as carbon dioxide in conjunction with an aqueous solution of a water-soluble surface active agent, a water-soluble polymer, a crosslinking agent for the polymer, and an alkaline material capable of delaying cross-linking of the polymer until it has been placed into the reservoir. The gelatinous foam generated in situ by this process blocks the highly permeable zones into which the flooding gases tend to finger and diverts subsequently injected gases and drive fluids into the less permeable, oil-containing zones, thereby substantially increasing the efficiency of oil recovery. Moreover, the stiff foam films of a gelatinous foam reduce the natural tendency of the foam to collapse by absorption of the soluble gas into the oil.

SUMMARY OF THE INVENTION

A method is provided for reducing the permeability zones of a subterranean reservoir having heterogeneous permeability and being penetrated by at least one well in which there is injected through a well and into the reservoir (1) an aqueous liquid solution of (a) a water soluble surface active agent, (b) a crosslinkable, water soluble polymer, (c) a material capable under certain conditions of at least partially crosslinking the polymer to form a gelatinous precipitate, and (d) a water-soluble alkaline material in an amount sufficient to maintain the pH of the aqueous solution above the pH at which crosslinking occurs until the composition has passed a desired distance through the reservoir; and (2) a foam emplacement gas comprising an acid gas component in an amount sufficient to initiate reaction of the polymer and the crosslinking agent so that a gelatinous foam forms in the higher permeability zones of the reservoir upon contact of the aqueous solution with the foam emplacement gas. As a result, subsequently injected flooding gas and drive fluids are diverted into the less permeable zones of the formation and oil recovery is thereby enhanced.

DETAILED DESCRIPTION OF THE INVENTION

The present invention provides a method for increasing the areal sweep efficiency of gas flooding, especially gaseous carbon dioxide flooding, for recovery of viscous oil from subterranean formations. During the course of gas flooding breakthrough of the flooding gas at a producing well signals the need for plugging highly permeable zones of the formation. The foam emplacement process of this invention is typically instituted midway in a gas flood utilizing carbon dioxide or any combination of gases containing an acid gas component, such as recycled reservoir gases, which typically will contain small amounts of carbon dioxide, hydrogen sulfide, and/or sulfur oxides. To effectively promote crosslinking, flooding gas used as a foam emplacement gas usually contains greater than 0.05 percent by volume of an acid gas. Gases used in a sulfur dioxide flooding regime can also be used as the acid gas in the practice of this invention.

In accordance with the present invention, an aqueous, liquid solution of (1) a water-soluble or water-dispersible polymer, (2) a material reactive for at least partially crosslinking the polymer to form a gelatinous precipitate, (3) a source of hydroxyl ions, such as a water soluble alkaline material, in an amount and concentration sufficient to retard crosslinking, and (4) a surfactant or foaming agent is injected into a well penetrating an oil-bearing formation, especially a formation containing viscous oil, such as a crude having an API gravity of below about 22° and viscosity greater than about 200 centipoise at 60° F. Following injection of the liquid solution a slug of foam emplacement gas containing an amount of acid gas sufficient to initiate reaction between the crosslinker and the polymer, usually greater than 0.01 percent by volume, is injected into the formation. These recovery fluids typically are driven through the reservoir by a subsequently injected aqueous flooding medium which displaces them towards at least one production or output well completed in the same reservoir.

As the fluids pass through the reservoir, the surfactant-polymer solution interacts within the reservoir with the injected gases, especially the acid gas, to form a thickened or gelatinous foam plug in those areas of the formation where the least resistance is presented to the passage of fluids. These locations of high permeability will contain little crude oil to depress foam formation, either because little oil is present due to previous treatment or, when carbon dioxide is the flooding gas, because the flooding gas dissolves readily in the oil in place and the decreased viscosity oil passes from the zones of high permeability. By contrast, in the less permeable zones of the formation, the oil in place depresses foam formation. As a result, a gelatinous plug containing thickened foam preferentially forms in and blocks passage of fluids through the highly permeable, relatively oil-free features of the reservoir, including strata, cracks and fissures. Consequently, the plug of thickened foam diverts subsequently injected flooding gases, especially any carbon dioxide contained therein, which is highly soluble in crude oil, into the less permeable, oil-containing zones of the reservoir where it is absorbed by the crude oil. As the carbon dioxide is absorbed, the viscosity of the carbon dioxide-crude oil solution decreases markedly.

This gelatinous foamed plug is equally effective for blocking the flow of flooding gases and of aqueous fluids, such as subsequently injected drive fluids, through the oil-depleted highly permeable zones of the formation since it possesses the properties of both foams and gels. This characteristic results from stiffened foam films of crosslinked polymer in the foam cells or bubbles resisting collapse of the foam as would typically happen in an ungelled foam due to dilution of the surface active agents by contact with water. Consequently, a subsequently injected drive fluid, typically aqueous, can readily move the flooding gases toward a producing well where petroleum and other fluids are recovered by conventional means.

A number of water-soluble polymers are known to form viscous aqueous polymer solutions when dissolved in relatively dilute concentrations. Exemplary water-soluble polymeric materials that can be employed in this invention are relatively high molecular weight acrylic acid-acrylamide copolymers, polyacrylamides, partially hydrolyzed polyacrylamides, polyalkyleneoxides, ammonium or alkali metal salts of carboxyalkylcelluloses, carboxyalkylhydroxyethyl celluloses, hydroxyethylcelluloses and heteropolysaccharides obtained by the fermentation of starch-derived sugar.

Many of the water-soluble polymers useful in the practice of this invention are characterized by a viscosity of at least 3 centipoises for a 0.1 parts by weight solution thereof in an aqueous 3 parts by weight sodium chloride solution at 25° C. as determined with a Brookfield viscometer equipped with a UL adapter and operated at a speed of 6 r.p.m. However, it is to be recognized that others of the water-soluble polymers, such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights in the range of above about $0.2 \times 10^6$, preferably from $0.5 \times 10^6$ to $40 \times 10^6$, preferably from $3 \times 10^6$ to $20 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, for example, sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide," as employed herein, is inclusive of the modified polymers wherein the carboxyl groups are in the acid form and also of such polymers wherein the carboxyl groups are in the salt form, provided that the salts are water-soluble. Alkali metal and ammonium salts are preferred. A number of polyacrylamides, partially hydrolyzed acrylamide polymers and acrylic acid-acrylamide copolymers suitable for use in this invention are commercially available; for example, Hi-Vis 350 polymer marketed by Tiorco Company of Denver, Colo., Pusher 700 polymer marketed by the Dow Chemical Company of Midland, Mich., Nalflo 550 polymer marketed by Nalco Chemical Company of Oak Brook, Illinois and Cyanatrol 950 polymer marketed by American Cyanamid of Wallingford, Connecticut.

Especially useful in the practice of this invention are the partially cationic polyacrylamides, the partially anionic polyacrylamides, and mixtures thereof. A partially cationic polyacrylamide is a nonionic polyacrylamide which contains a cationic comonomer, such as an alkylene polyamine, a quaternary ammonium chloride or amine hydrochloride, for example, trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be nonionic polyacrylamide which has been partially hydrolyzed to convert some of the acrylamide groups to acrylic acid groups, the alkali metal salts of which are anionic. Introducing sulfate or sulfonate groups into the polyacrylamide molecule also imparts an anionic character to the molecule. Polymer 1160 is a 20 percent by weight cationic, 80 percent nonionic copolymer marketed by Betz Laboratories, Inc. of Trevose, Pa. Polymer 1120 and Hi Vis polymer are 35 percent anionic, 65 percent nonionic polyacrylamides which have been partially hydrolyzed to the extent of 35 percent. These polymers are also marketed by Betz Laboratories, Inc.

The typical polyalkeneoxides employed in the invention have molecular weights in the range of from about $10^6$ to $10^8$, preferably from $10^6$ to $10^7$ and most preferably from $3 \times 10^6$ to $10 \times 10^6$. By "polyalkeneoxide" is meant herein any of the polymeric water-soluble resins prepared by homopolymerization of a single alkene oxide, for example ethylene oxide, propylene oxide or butylene oxide. It is preferred to employ the homopolymer of polyethylene oxide. This product is marketed by Union Carbide Corporation under the trademark "Polyox." Mixed polyalkeneoxides, made by heteropolymerization of more than one alkene oxide in either a random or block polymerization, may also be employed.

Also suitable for use in this invention are the alkali metal or ammonium salts of a carboxyalkylcellulose, such as carboxymethylcellulose. Carboxymethylcellulose may be represented by the formula:

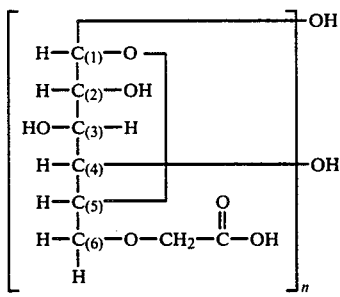

where n is a whole number greater than one, and the carboxymethyl anhydroglucose units are connected together by oxygen bridges between carbon atom (1) of one unit and carbon atom (4) of another unit. A salt of carboxymethylcellulose is carboxymethylcellulose wherein the H at the end of the carboxyamethyl group in one or more of the carboxymethyl and anhydroglucose units is replaced by a cation. In any molecule or group of molecules of carboxymethylcellulose, each anhydroglucose unit need not necessarily contain a carboxymethyl group although one or more anhydroglucose units may contain up to three carboxymethyl groups, the additional carboxymethyl groups being substituted for the H's of the OH groups on carbon atoms (2) and (3). As used herein, the term "carboxymethylcellulose" is defined as any carboxymethylcellulose having a degree of substitution less than one wherein the number of anhydroglucose units exceeds the number of carboxymethyl groups. Commercial grades of carboxymethylcellulose have a degree of substitution ordinarily between 0.5 and 0.9.

Hydroxyethylcellulose can be prepared from shredded wood pulp which has been soaked in 30 weight percent sodium hydroxide for about 20 hours. The resultant alkali cellulose is reacted with either ethylene oxide or ethylene chlorohydrin until a sufficient number of ethylene groups per glucose unit have been combined. The water-soluble form of hydroxyethylcellulose useful in this invention has a substitution (hydroxyethyl groups per glucose unit) greater than about 0.5, and preferably from 1.0 to 2.0. This is in contrast to the alkalisoluble form of hydroxyethylcellulose which has a substitution less than about 0.3. Generally, about 4 to 5 hours are required at about 40° C. for complete reaction of the alkali cellulose with the ethylene compound to produce a water-soluble hydroxyethylcellulose. The product is available commercially as either a solid fibrous material or in the form of aqueous solutions having up to about 10 weight percent hydroxyethylcellulose and viscosity ranges from about 10 to 1200 centipoises. A very high molecular weight hydroxy-ethylcellulose suitable for use in this invention is marketed by Hercules, Inc. under the trademark Natrosol 250. Another suitable hydroxyethylcellulose is marketed by the Union Carbide Corporation under the trademark Cellosize.

A particularly useful water-soluble cellulose ether is carboxymethylhydroxyethylcellulose, CMHEC, in which part of the carboxymethyl groups of carboxymethylcellulose are replaced with hydroxyethyl groups following well-known procedures. It is preferred that the carboxymethyl degree of substitution be at least 0.4. The degree of hydroxyethyl substitution is less important and can vary widely, for example, from about 0.1 to 0.4 or higher. A suitable CMHEC is marketed by Hercules, Inc. under the trademark SPX 5338.

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens.* Of these, ionic polysaccharide B-1459 is preferred. The polysaccharide B-1459 is prepared by culturing the bacterium *Xanthomona campestris* NRRL B-1459, U.S. Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trademark Kelzan MF marketed by Kelco Company of San Diego, Calif. Production of this heteropolysaccharide is well described in Smiley, K. L. "Microbial Polysaccharides-A Review", *Food Technology* 20, 9:112–116 (1966) and Moraine, R. A.; Rogovin, S. P.; and Smiley, K. L., "Kinetics of Polysaccharide B-1459 Synthesis", *J. Fermentation Technology* 44, 311–312 (1966).

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is some-times desirable to employ oil-field brine or other water containing relatively high dissolved salt contents, particularly where the reservoir into which they are to be injected is water-sensitive or where fresh water is not available. In most instances, the mobility of the water can be reduced to the desired level by the addition of about 0.03 to about 0.6 parts by weight of the polymer, and satisfactory results can often be obtained by the addition of 0.07 to 0.15 part by weight of polymer.

Materials which react with the polymer at a pH of about 9 or below to produce a polymer-containing plug are those which at least partially crosslink the polymer to form a gelatinous precipitate. Suitable crosslinking agents used in an amount sufficient to promote crosslinking of the polymer are an alkali metal or ammonium aluminate or gallate. exemplary materials include sodium aluminate, potassium aluminate, ammonium aluminate, and ammonium gallate, with sodium aluminate being preferred. Broadly, the amount of crosslinking agent to be used can range from about 0.001 to 2 parts by weight of the aqueous solution or dispersion. Preferably, about 0.002 to 0.02 part of crosslinking agent by weight of the aqueous solution or dispersion is employed.

By careful selection of particular polymers and crosslinking agents, the crosslinking reaction can be somewhat delayed; however, in most instances, the crosslinking reaction tends to start as soon as the components are mixed. Where such solutions are to be used as part of a well treating process, it would be highly desirable if the crosslinking reaction could be delayed so that the solution would not substantially increase in viscosity until the solution had been prepared on the surface, pumped down a well, and pumped out into the reservoir as far as the plug is desired to extend. If the onset of crosslinking is not delayed, fluid pumped into the reservoir can begin to gel in the wellstem or before it has passed a sufficient distance into the reservoir so that only a small volume of permeability reducing composition is used and it is relatively easy for subsequently injected fluids to bypass the portions of the reservoir containing the permeability reducing composition. Thus, desired permeability control in the reservoir may be lost.

An aqueous solution of a water-soluble or water-dispersible polymer and a crosslinking agent has a pH of about 8.7 to 9.25. It has been found that if the pH of such a solution is raised to about 9 or above, more particularly, 10 or above, as by the addition of a water-soluble alkaline material, no crosslinking reaction occurs even 30 or more days after mixing. A sufficient concentration of the alkaline material in the polymer solution, therefore, will delay the crosslinking reaction while the solution is being pumped into the well and a desired distance into the formation. The water-soluble alkaline material may comprise any compound which releases hydroxyl ions in aqueous solution, i.e., a hydroxyl ion precursor, and is usually selected from the group consisting of alkali metal and ammonium hydroxides, alkali metal silicates alkali metal and ammonium carbonates, and alkali metal phosphates. Sodium hydroxide is the preferred hydroxide, and sodium carbonate is the preferred carbonate. Water-soluble alkali metal silicates may be employed as the alkaline material, although in many embodiments of the invention no silicates or essentially no silicates are present in the alkaline material or in the injection fluid. If a silicate is used, sodium silicate is the most commonly employed alkali metal silicate. Any sodium silicate having a ratio of silica to sodium oxide of from about 1.5:1 to 4:1 by weight can be used. Preferably, the ratio should be from about 3:1 to 3.5:1. Examples of alkali metal phosphates which can be used include monobasic sodium phosphate, dibasic sodium phosphate and trisodium phosphate. The alkaline material is employed in a concentration of about 0.02 to 0.5, preferably about 0.05 to 0.2 part by weight of the aqueous solution or dispersion, with the amount of alkaline material added being sufficient to provide a pH above 9.0, usually above 9.2, and preferably above 10.0, so that crosslinking reactions between the polymer and crosslinking agent are retarded and preferably eliminated until contacted with the acid gas in the reservoir. The alkaline material can be added to water, followed by the aluminate or other crosslinking agent and finally the polymer.

Surface active agents suitable for use in the practice of this invention are water-soluble, and should have sufficient foaming ability and stability to form a stable foam in the highly permeable zones of a reservoir, thereby preventing carbon dioxide from channeling through highly permeable fissures, cracks or strata. More particularly, the term "surface active agent" as used in this specification and the appended claims denotes a surfactant or foaming agent having a tendency to generate foam, or to promote the generation of foam, in an underground reservoir or formation in the presence of a liquid and a gas. Such agents are known to alter the interface between liquid and gas phases or between two immiscible phases.

Non-limiting examples of preferred surface active agents useful in this invention are those which, when incorporated in an aqueous liquid such as water or seawater in an amount not in excess of 5 percent by weight, meet the following described test. The surface active agent is dissolved in an aqueous test medium and 500 milliliters of the solution is placed in a graduated cylinder to form a column having a height of 50 centimeters. Natural gas is passed into the bottom of the column through a fritted glass disc at substantially atmospheric pressure so that the gas bubbles through the column of liquid and passes out of the top of the cylinder. The gas rate is maintained at about 500 milliliters of gas per minute per square inch of column cross-sectional area, and the flow of gas is continued for a period of 15 minutes. A column of foam will then be found to exist at the top of the column of liquid hydrocarbon or water. The surface active agent, generally a foaming agent or surfactant, should preferably be capable of producing a column of foam not less than 180 centimeters in height under the conditions aforedescribed.

With some surface active agents, the aforedescribed test requirements will be met by incorporating quantities of surfactant or foaming agent far less than 2 percent by weight in the aqueous test medium. Thus, where it is found that 1 percent by weight of a given surface active agent is capable of meeting the requirements of the aforedefined test, it is preferred for reasons of economy that this amount be used. But typically the concentration of surface active agent in the aqueous solution is between about 0.1 and 2.0 weight percent active surface active agent. The use of excessive quantities of surfactant or foaming agents should be avoided for reasons of economy.

The use of various commercial high-foaming surfactants or foaming agents is contemplated. An example of a water-soluble surfactant or foaming agent preferred for promoting the formation of foam in oil-bearing reservoirs is alkyl polyethylene oxide sulfate, known commercially under the trade name "Alipal CD 128" and marketed by General Aniline and Film Corporation, and sodium linear alkyl aryl sulfonate known commercially as "Stepanflo 40" and marketed by Stepan Chemicals Corporation. In the preferred embodiment, the water-soluble surface active agent is selected from the group consisting of dioctyl sodium sulfosuccinate, modified ether alcohol sulfate sodium salts, sodium lauryl sulfate, dioctyl sodium sulfosuccinate, alkyl polyethylene oxide sulfates, and sodium linear alkyl aryl sulfonate. Other examples of suitable foam-producing agents include dimethyl didodecenyl ammonium chloride, methyl trioctenyl ammonium iodide, trimethyl decenyl ammonium chloride, dibutyl dihexadecenyl ammonium chloride, and water-soluble salts of esters of $C_3$-$C_6$ sulfodicarboxylic acids having the general formula

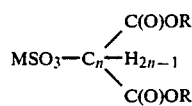

where M is a substituent forming a water-soluble salt, such as alkali metals, ammonium, and substituted ammonium, R is a $C_3$-$C_{16}$ alkyl substituent, and n is an integer from 1–4, e.g., monosodium dioctyl sulfosuccinate, ammonium dilaurylsulfosuccinate, monosodium dibutyl sebacate, monosodium diamyl sulfo-adipate, and others. Still other suitable foam-producing agents include water-soluble perfluoroalkanoic acids ard salts having 3-24 carbon atoms per molecule, e.g., perfluorooctanoic acid, perfluoropropanoic acid, and perfluorononanoic acid. Other surfactive agents which may be used in the practice of this invention are modified fatty alkylolamides, polyoxyethylene alkyl aryl ethers, sodium lauryl sulfate, and octylphenoxyethanols as well as the following commercial products:

| Trade Name | Chemical Name |
|---|---|
| Aerosol C-61 | Ethanolated alkyl guanidine-amine complex |
| Aerosol OS | Isopropylpaphthalene sodium sulfonate |
| Aerosol OT | Dioctyl sodium sulfosuccinate |
| Duponol EP | Alkyl alkylolamine sulfate |
| Duponol RA | Modified ether alcohol sulfate sodium salt |
| Duponol WAQ | Sodium lauryl sulfate |
| Ethomid HT-15 | Condensation of hydrogenated tallow amide and ethylene oxide |
| Miranol HM Concentrate | Ethylene cyclomido 1-lauryl, 2-hydroxy ethylene Na alcoholate, methylene Na carboxylate |
| Miranol MM | Same as Miranol HM except myristyl group is substituted for lauryl group |
| Nacconal 40F | Alkyl arylsulfonate |
| Petrowet R | Sodium hydrocarbon sulfonate |
| Petrostep 420 | Petroleum sulfonate |
| Pluronic L44 | Condensation product propylene oxide with ethylene oxide |
| Sorbit AC | Sodium alkyl naphthalene sulfonate |
| Sulfanole FAF | Sodium salt of fatty alcohols, sulfated. |
| Triton X-100 | Octylphenoxy polyethoxy ethanol. |
| Span 20 | Sorbitan Monolaurate |
| Span 40 | Sorbitan Monopalmitate. |
| Span 85 | Sorbitan Trioleate |
| Tween 65 | Polyoxyethylene Sorbitan Tristearate |
| Tween 81 | Polyoxyethylene Sorbitan Monooleate |
| Triton GR-7 | Dioctyl Sodium Sulfosuccinate |
| Triton B-1956 | Modified Phthalic Glycerol Alkyl Resin |
| Triton X-45 | Octylphenoxy polyethoxy ethanol |
| Triton X-100 | Acetylphenoxy polyethoxy ethanol |
| Witco TRS 10-40 | Petroleum sulfonates |
| Witconate AOS | Alpha olefin sulfonate |

Typically, the aqueous polymer-surfactant solution containing the alkaline component is pumped into the well in an amount of about 2 to 800 barrels per vertical foot of strata to be treated and immediately followed by at least one slug of foam emplacement gas containing a crude oil insoluble component and an acid gas component at least partially soluble in aqueous solutions. The foam emplacement gas containing the crude oil insoluble and acid gas components is capable of interacting with the polymer-surfactant solution both to generate foam and to lower the pH of the solution sufficiently to trigger crosslinking of the polymer.

The aqueous polymer solution employed in the treatment of this invention is a dilute solution of a water-soluble or water-dispersible polymer in an aqueous medium, such as fresh water, seawater, or brine, whose onset of gelation can be controlled by the amounts of alkaline material contained therein and the amount of acid gas with which it is brought into contact. One aqueous medium contemplated for use in the invention is connate water withdrawn from the reservoir.

Once the slugs of aqueous polymer-surfactant solution and foam emplacement gases have been positioned into the reservoir, the gases will tend to finger through the polymer-surfactant solution, creating a foam. The acid gas components in the gases will reduce the pH of the aqueous foam film resulting in a gelled foam having superior resistance to natural attrition by drainage and breakage by both gases and liquids. Stiffness of the gel can be controlled by changing the relative amounts of polymer, crosslinker, and acid gas. Depending upon the concentrations of the components of the treating fluids and the conditions of the reservoir, the desired reduction in permeability can occur almost immediately after injection of the treating fluids has been terminated or up to several days thereafter. Therefore, the depth of penetration of the gel can also be controlled. Successful reduction in permeability will be detected by a corresponding rise in the injection pressure of the reservoir or by a change in the fluid entry profile in the wellbore.

Appearance of the flooding gases at the producing well signals escape of the treating gases into high permeability zones. Therefore, foam emplacement typically commences when during a gas flooding regime the breakthrough of the flooding gases is detected at the producing well. Then the foam emplacement regime is instituted, typically beginning with injection of the polymer-surface active solution followed by injection of the foam emplacement gases.

Usually the foam emplacement gases are a mixture of gases containing an acid gas component. Any mixture of hydrocarbon and non-hydrocarbon gases can be used provided the foam emplacement gas mixture contains an acid gas component usually greater than about 0.03 percent, but preferably greater than about 0.05 percent by weight. But in the preferred embodiment, to assure that enough gases remain undissolved to generate the foam, a component of noncondensible, crude oil insoluble gases is also included in the foam emplacement gases to assure formation of a stable gelatinous foam. The noncondensible, crude oil insoluble gases used in the process of this invention usually comprise a nonhydrocarbon gas that is substantially both noncondensible and insoluble in crude oil at typical reservoir conditions of between about 90° and 180° F. and between about 700 and 2500 p.s.i.g. of pressure. Examples of crude oil insoluble gases are hydrogen, air, argon, nitrogen, and certain organic gases, such as halogenated hydrocarbons. The remaining components of the foam emplacement gas mixture are usually multicontact or first contact miscible gases, such as carbon dioxide, hydrocarbon gases, sulfur dioxide, or mixtures thereof.

For the purposes of this specification and the claims appended hereto, an acid gas is any gas which is soluble in water and when so dissolved lowers the pH of the aqueous solution. Examples of acid gases suitable for use as the acid gas component in the foam emplacement gases are carbon dioxide, hydrogen sulfide, and sulfur oxides, and the preferred acid gas is carbon dioxide.

When the slug of foam emplacement gas contacts the aqueous surfactant-polymer solution within the reservoir, a portion of the acid gas component dissolves therein, lowering the pH of the solution below that at which the onset of crosslinking occurs despite the action of the alkaline material to maintain the solution at high pH. Meanwhile, the undissolved gases generate foam and/or foam-like flow-retarding barriers or films in the partially gelatinous solution contained within the pores and other highly permeable structures of the reservoir, such as cracks and fissures. For the purposes of this specification and the claims appended hereto, such flow-retarding barriers or films within the pores of the reservoir rock are referred to as "foam." Usually only a portion of the aqueous solution foams so that upon contact with the acid gas a portion of the surfactant-polymer solution remains as an unfoamed gel.

Although in the preferred embodiment the foam emplacement gas is administered as a single slug comprising both acid and crude oil insoluble gas components, in an alternative embodiment the foam emplacement gas is divided into two slugs for injection. The first slug contains a sufficient amount of an insoluble gas to foam the surfactant-polymer solution but contains substantially no acid gases so that the surfactant-polymer solution will remain substantially uncrosslinked until the insoluble gas has generated a stable foam in at least a portion of the solution by interaction with the surface active agent therein. The second slug contains a sufficient amount of an acid gas component to initiate crosslinking within both the foamed and the unfoamed portions of the gel. Preferably the insoluble gas is a crude oil-insoluble, non-condensible, non-hydrocarbon gas such as hydrogen, air, argon, nitrogen, or mixtures thereof, but any mixture of gases containing a substantial component of crude oil-insoluble gases, whether hydrocarbon or non-hydrocarbon, can be used. Usually, the first slug of foam emplacement gases comprises nitrogen for generating the foam and the second slug of foam emplacement gases comprises carbon dioxide for initiating crosslinking of the polymer.

In yet another embodiment, during foam emplacement repeated cycles are injected of the polymer-surface active solution and of the foam emplacement gases, whether divided into separate slugs containing the insoluble and acid gas components, or not. This procedure is particularly recommended if successive zones of high permeability are encountered during the recovery regime. In the preferred embodiment of cyclic injection, the foam emplacement gases are not divided into separate slugs comprising insoluble and acid gas components, but the acid gas and insoluble gas components are contained within single slugs which are injected alternately with the slugs of polymer-surfactant solution. After emplacement of the thickened foam, injection of the flooding gases can be resumed.

To determine effectiveness of the thickened foam emplacement procedure or the point at which the highly permeable zones have been effectively plugged, comparative tests such as tests to determine injectivity to gas and the permeability of the formation, or of any selected zones of the formation, can be conducted. Preferably test results obtained before thickened foam emplacement is undertaken are compared with results obtained at convenient intervals during foam emplacement to determine the progress and results of the foam emplacement regime.

When during foam emplacement a solvent gas, such as carbon dioxide, is diluted with an insoluble gas, the result will be decreased rather than increased oil recovery if the proportion of insoluble gas becomes too large. What proportion of insoluble gas will be effective in the particular reservoir to be treated will depend in part upon pressure and temperature in the reservoir and what proportion of the total pore volume of the reservoir is occupied by highly permeable zones and features. It has been found in the practice of this invention that when a polymer-surfactant solution is injected in conjunction with the mixture of insoluble and solvent acid gases, preferably a mixture of nitrogen and carbon dioxide, dilution of the solvent carbon dioxide gas with up to 20 volume percent of insoluble nitrogen is effective for increasing oil recovery over that achieved by injection of the solvent gas alone.

The amount of the foam emplacement gases injected into the subterranean formation will also vary for different formations, and will depend upon total reservoir pore volume, crude oil pore volume, formation pressure and temperature and other unique formation characteristics. Throughout this description and the appended claims the term "effective pore volume" means that portion of the reservoir expected to be contacted by the total flooding gases injected.

To achieve the best success in carrying out the process of this invention in a regime of solvent gas flooding, typically a total of between about 0.01 and 0.2, and preferably between about 0.01 and 0.05, effective pore volume of a foam emplacement gas mixture containing carbon dioxide and a non-condensible, crude oil-insoluble, non-hydrocarbon gas is injected through an input or injection well into the formation. The carbon dioxide in the gas mixture is injected as a gas or dense fluid under conditions such that in the reservoir the carbon dioxide is gaseous, the gas mixture having a density at or below the critical density for carbon dioxide of 0.42 grams per cubic centimeter.

The amount of surfactant or foaming agent used will be determined according to the requirements of the reservoir being treated, but generally it has been found that for successful foam emplacement the solution comprising polymer and surface active agent should represent between about 0.1 and 10 volume percent of the total injected fluids, exclusive of the drive fluid. Or, expressed in terms of the effective pore volume of the reservoir to be treated, between about 0.01 and 0.05 effective pore volume of a 0.1 to 2.0 weight percent active solution of surfactant or foaming agent dissolved in an aqueous solution containing polymer in a concentration between about 0.03 and 0.6 part by weight will be effective followed by injection of between about 0.01 and 0.2 effective pore volume of the foam emplacement gases. More preferably, between about 0.01 and 0.05 effective pore volume of a 0.5 to 1.0 weight percent active solution of surfactant or foaming agent dissolved in an aqueous solution of polymer having a concentration between about 0.07 and 0.15 part by weight is injected followed by injection of between about 0.01 and 0.05 effective pore volume of the foam emplacement gases. Then, injection of the remaining amount of between about 0.1 to 1.0 effective pore volume of the gas flooding mixture is resumed. Alternatively, injection of a gas flooding mixture is resumed until one effective pore volume of the flooding gas has been introduced into the reservoir.

In an alternative embodiment, during foam emplacement the foam emplacement gases and solution of polymer-surface active agent are injected repeatedly in small slugs to facilitate contact between the insoluble gas, the foaming agent, and reservoir fluids. More particularly, at the point during a typical carbon dioxide flood that breakthrough of carbon dioxide gas occurs at a producing well, foam emplacement is started. In repeated series, slugs of the polymer-surface active solution, a crude oil-insoluble gas, and carbon dioxide are injected. The slugs are typically as small in size as is economically feasible while achieving the goal of maximum contact between the insoluble gas and the foaming agent. The size of each gas slug is up to 10 times the size of the polymer-surfactant slugs. Preferably the slugs of the solution of polymer and surface active agent are between about 0.001 and 0.01 effective pore volume in size, while the gas slugs are preferably between about 0.002 and 0.1 effective pore volume in size.

Repeated sequences injecting slugs in turn of polymer-surfactant solution, insoluble, non-condensible gas, and carbon dioxide usually continue until sufficient foam has been generated in the reservoir to block the highly permeable zones and features. Typically between about 4 and 10 sequences of alternation are required. Tests to determine gas injectivity and permeability are usually conducted to determine when the highly permeable zones have been satisfactorily plugged. More preferably, a total of between about 5 and 7 cycles of gas flooding mixture and surfactant solution is injected, followed by continuous injection of the gas mixture until a cumulative total of about one effective pore volume of carbon dioxide has been injected. This regime of repeated sequences of injection is most useful when new fingers of high permeability are continuously encountered during the foam emplacement process.

To propel the bank of chemical additives through the reservoir, a drive medium having a favorable mobility ratio with respect to the mixture of fluids to be moved through the reservoir is employed. The drive medium typically comprises fresh, saline, carbonated water, or any mixture of these, and preferably contains a thickening agent to improve the mobility ratio between the drive fluid and the reservoir fluids. Sufficient drive medium is employed to push the chemical additives through the reservoir from the injection well to a production well. Injection of the drive fluid is usually continued until the liquids produced from the production well have a high water/oil ratio, at which time injection of drive fluid is commonly terminated. Subsequent to terminating injection of the drive fluid, the formation can be depressurized to allow formation of additional foam by any gases coming out of solution or to drive additional oil towards the production well.

The injection and production wells can be arranged in any convenient pattern designed to achieve maximum contact of the oil-bearing zones by the advancing flood front—such as the conventional "five-spot" pattern of a central producing well surrounded by four somewhat symmetrically located injection wells. Another conventional flooding pattern that can be employed in the practice of this invention is the "line-drive" pattern in which the injection wells are arranged in a line so that the injected flooding medium advances through the formation to displace oil toward one or more spaced production wells arranged in a line substantially parallel to the line of injection wells.

Although the invention has been described in conjunction with embodiments thereof, including a preferred embodiment, it is apparent that the invention is capable of many modifications, alternatives and variations. Accordingly, it is intended to embrace within the invention all such modifications, alternatives and variations as may fall within the spirit and scope of the appended claims.

We claim:

1. A method for reducing the permeability of the higher permeability zones of a subterranean reservoir having heterogeneous permeability and being penetrated by at least one well, said method comprising:
   (1) injecting through a well and into a subterranean reservoir:
      (a) an aqueous liquid solution comprising:
         (1) a water-soluble or water-dispersible polymer;
         (2) a crosslinking agent for the polymer capable of reacting with the polymer to produce a gel;
         (3) a source of hydroxyl ions in an amount sufficient to retard the reaction of the polymer with the crosslinking agent;
         (4) a water soluble surface active agent;
      (b) a foam emplacement gas comprising an acid gas; and
      (c) allowing a gelatinous stable foam having stiffened foam films of crosslinked polymer to form in the higher permeability zones.

2. The method of claim 1 wherein the foam emplacement gas contains between about 0.5 and 20 volume percent of a crude oil-insoluble, noncondensible gas and greater than 0.03 percent by volume of an acid gas.

3. The method of claim 2 wherein the aqueous solution contains between about 0.1 and 2.0 weight percent active surface-active agent and the amount of the solution injected is between about 0.1 and 10 volume percent of the total fluids injected in step 1.

4. The method of claim 3 wherein between about 0.01 and 0.2 effective pore volume of the foam emplacement gas and between about 0.01 and 0.05 effective pore volume of the aqueous solution comprising 0.1 to 2.0 weight percent active solution of surface-active agent and 0.03 to 0.6 weight percent of polymer is injected.

5. The method of claim 4 wherein the polymer is selected from the group consisting of polyacrylamides, carboxyalkyl cellulose, hydroxyethyl cellulose, polyalkyloxides, and heteropolysaccharides. The source of hydroxyl ions is selected from the group consisting of ammonium and alkali metal hydroxides, phosphates, carbonates, and silicates, and the crosslinking material is selected from the group consisting of ammonium and alkali metal aluminates and gallates.

6. The method of claim 4 wherein the foam emplacement gas comprises carbon dioxide.

7. The method of claim 6 wherein injection is under conditions such that the foam emplacement gas maintains a density between 0.01 and 0.42 grams per cubic centimeter in the reservoir.

8. The method of claim 1 wherein the foam emplacement gas is a mixture of miscible hydrocarbon gases comprising an acid gas component.

9. The method of claim 1 wherein the acid gas component is selected from the group consisting of carbon dioxide, hydrogen sulfide, sulfur dioxide, sulfur trioxide, and mixtures thereof, and the concentration of the acid gas component is greater than 0.05 percent by weight of the foam emplacement gas.

10. The method of claim 1 wherein the foam emplacement gas comprises a crude oil-insoluble, non-condensible, non-hydrocarbon gas component and an acid gas component, the acid gas component having a concentration of greater than about 0.1 percent by weight of the foam emplacement gas.

11. The method of claim 1 wherein the flooding gas is any combination of multicontact miscible gases having an acid gas component of greater than 0.05 percent by weight and the flooding gas is used as the foam emplacement gas.

12. The method of claim 1 wherein the flooding gas is any first contact miscible gas having an acid gas component of greater than 0.03 percent by weight and the flooding gas is used as the foam emplacement gas.

13. A method for reducing the permeability of the higher permeability zones of a subterranean reservoir having heterogeneous permeability and being penetrated by at least one well, said method comprising:
  (1) injecting through a well and into a subterranean reservoir:
    (a) an aqueous liquid solution comprising:
      (1) a water-soluble or water dispersible polymer;
      (2) a crosslinking agent for the polymer capable of reacting with the polymer to produce a gel;
      (3) a source of hydroxyl ions in an amount sufficient to retard the reaction of the polymer with the crosslinking agent; and
      (4) a water soluble surface-active agent;
    (b) a foam emplacement gas comprising:
      (1) a crude oil-insoluble, non-condensible, non-hydrocarbon gas; and
      (2) an acid gas; and
  (2) allowing a stable gelatinous foam to form in the higher permeability zones of the reservoir, said gelatinous foam being substantially impenetrable to both gases and liquids and having stiffened foam films of cross-linked polymer.

14. The method of claim 13 wherein the polymer is selected from the group consisting of polyacrylamides, carboxyalkyl cellulose, hydroxyethyl cellulose, polyethylene oxides and heteropolysaccharides. The source of hydroxyl ions is selected from the group consisting of ammonium and alkali metal hydroxides, phosphates, carbonates, and silicates, and the crosslinking material is selected from the group consisting of ammonium and alkali metal aluminates and gallates.

15. The method of claim 14 wherein the crosslinking agent for the polymer is capable of reacting with the polymer to produce a gel at a pH below about 9.2 but not above about 9.2, sufficient alkaline material is dissolved in the aqueous solution to raise the pH of the solution above about 10.0 in the absence of the acid gas, sufficient crude oil insoluble gas is injected to substantially foam the aqueous solution, and sufficient acid gas is injected to reduce the pH of the aqueous solution to a pH below about 9.2 to initiate reaction between the polymer and the crosslinking agent.

16. The method of claim 13 wherein the crude oil-insoluble, noncondensible, non-hydrocarbon gas is selected from the group consisting of nitrogen, air, argon, hydrogen, or mixtures thereof, and the acid gas is selected from the group consisting of carbon dioxide, hydrogen sulfide, and sulfur oxides.

17. The method of claim 13 wherein the crude oil-insoluble gas is nitrogen.

18. The method of claim 13 wherein a total of between about 0.01 and 0.05 effective pore volume of the aqueous solution containing a 0.5 to 1.0 parts by weight active solution of surface active agent and between 0.03 and 0.6 part by weight of the polymer is injected, the crude oil insoluble gas comprises nitrogen, and the acid gas comprises carbon dioxide.

19. The method of claim 18 wherein a total of between about 0.01 and 0.05 effective pore volume of the foam emplacement gas is injected and between about 0.01 and 0.05 effective pore volume of a 0.5 to 1.0 weight percent active solution of surface active agent, and between 0.07 and 0.15 part by weight of the polymer is injected.

20. The method of claim 13 wherein the concentration of polymer is between about 0.03 and 0.6 part by weight, the concentration of the alkaline material is between about 0.02 and 0.5 part by weight, the concentration of the crosslinking agent is between about 0.001 and 0.2 part by weight and the concentration of the surface active agent is between about 0.1 and 2.0 parts by weight of the solution.

21. The method of claim 13 wherein the concentration of polymer is between about 0.07 and 0.15 part by weight, the concentration of the alkaline material is between about 0.05 and 0.2 part by weight, the concentration of the crosslinking agent is between about 0.002 and 0.02 part by weight and the concentration of the surface active agent is between about 0.3 and 0.75 part by weight of the solution.

22. The method of claim 13 wherein the crosslinking agent is selected from the group consisting of an alkali metal or ammonium aluminate or gallate; the polymer is selected from the group consisting of polyacrylamides, carboxyalkyl cellulose, polyethylene oxide, hydroxyethyl cellulose, heteropolysaccharides, and mixtures thereof; the alkali material is selected from the group consisting of alkali metal and ammonium hydroxides, alkali metal silicates, alkali metal and ammonium carbonates, and alkali metal phosphates; and the surface active agent is selected from the group consisting of dioctyl sodium sulfosuccinate, alkyl polyethylene oxide sulfate, sodium linear alkyl aryl sulfonate, modified ether alcohol sulfate sodium salts, sodium lauryl sulfate, dioctyl sodium sulfosuccinate, alkyl polyethylene oxide sulfates, alpha olefin sulfonates and petroleum sulfonates.

23. The method of claim 10 wherein the crosslinking agent is sodium aluminate.

24. A method for reducing the permeability of the higher permeability zones of a subterranean reservoir having heterogeneous permeability and being penetrated by at least one well, the method comprising:
  (1) injecting through a well and into a subterranean reservoir:

(a) an aqueous solution comprising: (1) a water soluble or water dispersible polymer selected from the group consisting of acrylic acid-acrylamide copolymers, polyacrylamides, partially hydrolyzed polyacrylamides, polyalkyleneoxides, carboxyalkylcelluloses, carboxyalkylhydroxyethylcelluloses, hydroxyethylcelluloses and heteropolysaccharides obtained by the fermentation of starch-derived sugar; (2) a crosslinking agent for the polymer comprising a water-soluble salt of a polyvalent cation reactive for crosslinking the polymer with the cation being contained in an unreactive anionic species; (3) an amount of water-soluble alkaline material sufficient to raise the pH of the overall aqueous liquid to a value at which the polyvalent cation exists in an anionic species essentially unreactive to the polymer; and (4) an amount of a water-soluble surface active agent sufficient to foam the aqueous solution upon contact with a foam emplacement gas; and (b) a foam emplacement gas comprising an acid gas component in an amount sufficient to lower the pH of the aqueous liquid to a value at which the anionic species becomes a polyvalent cation reactive for crosslinking the polymer;

(2) allowing a stable gelatinous foam having stiffened foam films of crosslinked polymer capable of resisting collpase of the foam to form in the higher permeability zones of the subterranean reservoir.

25. The method of claim 24 wherein the acid gas component is selected from the group consisting of carbon dioxide, hydrogen sulfide, sulfur oxides, and mixtures thereof.

26. The method of claim 24 wherein the foam emplacement gas comprises carbon dioxide.

27. The method of claim 24 wherein the foam emplacement gas further comprises an insoluble gas component selected from the group consisting of hydrogen, air, argon, nitrogen, and mixtures thereof.

28. The method of claim 27 wherein the remaining components of the foam emplacement gas are multicontact miscible gases selected from the group consisting of carbon dioxide, hydrocarbon gases, sulfur dioxide, or mixtures thereof, and the surface active agents are selected from the group consisting of alkyl polyethylene oxide sulfate, dioctyl sodium sulfosuccinate, modified ether alcohol sulfate sodium salts, sodium lauryl sulfate, dioctyl sodium sulfosuccinate, alkyl polyethylene oxide sulfates, sodium linear alkyl aryl sulfonate, and mixtures thereof.

29. The method of claim 24 wherein the crosslinking agent is selected from the group consisting of ammonium and alkali metal aluminates and gallates.

30. A method for reducing the permeability of the higher permeability zones of a subterranean reservoir containing viscous crude oil, having heterogenous permeability, and being penetrated by at least one injection well and one producing well comprising:

(1) injecting sequentially through an injection well and into the reservoir;
(a) a quantity of a flooding gas sufficient to result in breakthrough of the flooding gas at a producing well;
(b) an aqueous solution comprising:
(1) a surface active agent,
(2) a water soluble, crosslinkable polymer,
(3) a crosslinking agent for the polymer capable of reacting with the polymer to produce a gel, and
(4) a source of hydroxyl ions in an amount sufficient to retard the reaction of the polymer with the crosslinking agent;
(c) a first foam emplacement gas comprising a crude oil insoluble, noncondensible gas component in an amount sufficient to foam the aqueous solution;
(d) a second foam emplacement gas comprising an acid gas component in an amount sufficient to initiate reaction between the polymer and the crosslinking agent and to form stiffened foam films of crosslinked polymer in the foam generated in step 1(d); and (2) allowing a stable gelatinous foam to form in the higher permeability zones by interaction of the first and second foam emplacement gases and the aqueous solution comprising polymer and surface active agent so that the stiffened foam films form and the permeability of the zones is thereby reduced.

31. The method defined in claim 30 wherein the acid gas comprises carbon dioxide and the insoluble gas comprises nitrogen.

32. A method for reducing the permeability of the higher permeasbility zones of a subterranean reservoir containing viscous crude oil, having heterogeneous permeability, and being penetrated by at least one injection well and one producing well comprising:

(1) injecting sequentially through an injection well and into the reservoir:
(a) a quantity of a flooding gas sufficient to result in breakthrough of the flooding gas at a producing well;
(b) an aqueous solution comprising: (1) a surface active agent, (2) a water soluble, crosslinkable polymer, (3) a crosslinking agent for the polymer capable of reacting with the polymer to produce a gel, and (4) a source of hydroxyl ions in an amount sufficient to retard the reaction of the polymer with the crosslinking agent;
(c) a foam emplacement gas mixture comprising a crude oil insoluble, noncondensible gas component and an acid gas component, and (2) allowing a stable gelatinous foam having stiffened foam films of crosslinked polymer to form in the higher permeability zones by interaction of the foam emplacement gas mixture and the solution comprising polymer and surface active agent so that the permeability of the zones is thereby reduced.

33. A method for reducing the permeability of the higher permeability zones of a subterranean reservoir containing viscous crude oil, having heterogeneous permeability, and being penetrated by at least one injection well and one producing well comprising:

(1) injecting sequentially through an injection well and into the reservoir;
(a) a quantity of a gas flooding mixture comprising carbon dioxide sufficient to result in breakthrough of carbon dioxide at a producing well, the injection being at conditions such that the gas flooding mixture maintains a density between about 0.01 and 0.42 grams per cubic centimeter in the reservoir;
(b) an aqueous solution comprising: (1) a surface-active agent, (2) a water soluble, crosslinkable polymer, (3) a crosslinking agent for the polymer capable of reacting with the polymer to produce a gel, and (4) a source of hydroxyl ions in an amount sufficient to retard the reaction of the polymer with the crosslinking agent;

(c) a foam emplacement gas mixture comprising carbon dioxide and a crude oil-insoluble, noncondensible, non-hydrocarbon gas, the injection being at conditions such that the foam emplacement gas mixture maintains a density between about 0.01 and 0.42 grams per centimeter in the reservoir; and (2) allowing a stable gelatinous foam having stiffened foam films of crosslinked polymer to form in the higher permeability zones by interaction of the foam emplacement gas mixture and the solution comprising polymer and surface active agent so that the permeability of the zones is thereby reduced.

34. The method of claim 33 wherein the foam emplacement gas mixture contains between about 0.5 and 20 volume percent of the crude oil-insoluble, noncondensible gas.

35. The method of claim 33 wherein the foam emplacement gas mixture contains between about 10 and 15 volume percent of the crude oil insoluble gas and the crude oil insoluble gas is nitrogen.

36. The method of claim 33 wherein the solution comprising polymer and surface-active agent contains between about 0.1 and 2.0 weight percent active surface-active agent and the amount of the solution injected is between about 0.1 and 10 percent of the total fluids injected in step (1).

37. The method of claim 33 wherein between about 0.01 and 0.2 pore volume of the foam emplacement gas mixture and between about 0.01 and 0.05 effective pore volume of the aqueous solution comprising polymer and surface active agent is injected and the solution contains between about 0.1 and 2.0 weight percent of active surface active agent.

38. The method of claim 33 wherein between about 0.01 and 0.05 effective pore volume of the solution comprising polymer and surface-active agent is injected followed by injection of between about 0.01 and 0.05 effective pore volume of the foam emplacement gas mixture and the solution contains between about 0.5 and 1.0 weight percent of active surface active agent and the concentration of the polymer in the aqueous solution is between about 0.07 and 0.15 part by weight.

39. The method of claim 36 wherein the surface-active agent is selected from the group consisting of dioctyl sodium sulfosuccinates, modified ether alcohol sulfate sodium salts, sodium lauryl sulfate, dioctyl sodium sulfosuccinate, and alkyl polyethylene oxide sulfates and the crude oil-insoluble, noncondensible gas is selected from the group consisting of hydrogen, nitrogen, air, argon, and mixtures thereof.

40. The method of claim 33 wherein the crude oil-insoluble, noncondensible, non-hydrocarbon gas comprises nitrogen.

41. A method of enhanced recovery of viscous oil from a subterranean formation having a heterogeneous permeability and containing viscous crude oil, said formation being penetrated by at least one injection well and at least one recovery well comprising:

(1) utilizing the method of claim 33 for reducing the permeability of the higher permeability zones of the heterogeneous formation;

(2) injecting through the injection well and into the less permeable zones of the formation a gas flooding mixture comprising carbon dioxide so that the viscosity of the viscous oil is thereby reduced;

(3) injecting sufficient drive fluid through the injection well so that reduced viscosity oil is displaced from said reservoir; and (4) recovering the reduced viscosity oil displaced from the reservoir through a recovery well.

42. The method of claim 33 wherein the injection sequence of steps (1) and (2) is repeated so long as higher permeability zones are encountered during the course of a gas flood.

43. The method of claim 33 comprising the following additional steps:

(3) injecting through an injection well and into the less permeable zones of the formation a flooding gas comprising carbon dioxide so that the flooding gas has a density between 0.01 and 0.42 grams per cubic centimeter within the reservoir;

(4) injecting sufficient drive fluid through the injection well to displace crude oil from the reservoir; and (5) recovering crude oil displaced from the reservoir through a recovery well.

* * * * *

UNITED STATES PATENT AND TRADEMARK OFFICE
CERTIFICATE OF CORRECTION

PATENT NO. : 4,694,906

DATED : September 22, 1987

INVENTOR(S) : Richard D. Hutchins and Hoai T. Dovan

It is certified that error appears in the above-identified patent and that said Letters Patent is hereby corrected as shown below:

In column 16, line 63, delete ". The" and insert therefor --;--.

In column 17, line 57, delete ". The" and insert therefor --;--.

Signed and Sealed this

Seventh Day of March, 1989

Attest:

DONALD J. QUIGG

*Attesting Officer*   *Commissioner of Patents and Trademarks*